United States Patent [19]

Austin et al.

[11] 4,199,890
[45] Apr. 29, 1980

[54] FISHING LINE RELEASE DEVICE

[76] Inventors: Milton Austin, 3 Spielman Rd., Fairfield, N.J. 07006; Arthur G. Kendall, 37 Passaic Ave., Livingston, N.J. 07039

[21] Appl. No.: 882,672

[22] Filed: Mar. 2, 1978

[51] Int. Cl.² ............................................. A01K 91/06
[52] U.S. Cl. ............................. 43/43.12; 24/201 TR; 24/241 S
[58] Field of Search ............... 43/43.1, 43.11, 43.12, 43/44.87, 44.88, 44.92; 24/115 F, 201 TR, 230 AP, 241 S, 241 SP

[56] References Cited

U.S. PATENT DOCUMENTS

| Re. 25,650 | 10/1964 | Strumpf | 43/43.12 |
| 2,730,832 | 1/1956 | Mathers | 43/43.11 |
| 2,838,866 | 6/1958 | Labin | 43/43.12 |
| 3,037,317 | 6/1962 | Morrison | 43/43.12 |
| 3,659,370 | 5/1972 | Ritter | 43/43.12 |
| 3,879,884 | 4/1975 | Tucker, Sr. | 43/43.12 X |
| 3,905,148 | 9/1975 | Naone et al. | 43/43.12 |
| 3,930,330 | 1/1976 | Black | 24/115 F X |
| 4,069,611 | 1/1978 | Pusich et al. | 43/43.12 |

Primary Examiner—Harold D. Whitehead
Assistant Examiner—K. Bradford Adolphson
Attorney, Agent, or Firm—David A. Jackson

[57] ABSTRACT

A fishing line release device is disclosed which can be constructed for use with both outrigger and flatline fishing gear. The release device comprises a release housing comprising an axially adjustable spool and a line securing hook rotatably mounted thereon. The spool comprises paired shell members having central hubs to accept a threaded adjustment shaft. Rod-like stop members project inwardly from opposing shell members into spaced-apart circumferential disposition, and releasably hold the hook in a line engaging position in cooperation with a peripheral recess defined by the shell members.

5 Claims, 6 Drawing Figures

FISHING LINE RELEASE DEVICE

BACKGROUND OF THE INVENTION

This invention relates to a fishing line release device. More particularly, this invention relates to a fishing line release device in which slack is automatically provided in the fishing line after the bait has been initially attacked by a fish.

After a fish has initially struck at the bait, it is desirable to have the bait remain motionless in the water. In this manner, the fish, thinking that it has stunned its prey, will circle back and fully attack the bait, whereupon the hook will become firmly embedded in its mouth. The problem of causing the bait to remain idle in the water is especially so when the line is taut and connected to a boat in motion.

Many prior art devices have sought to solve this problem by providing a slack in the line after the first strike by the fish, thereby rendering the bait virtually motionless in the water. Some of these devices have utilized complex spring mechanisms which provide the needed slack in the line when the bait is attacked. For example, U.S. Pat. No. 3,037,317 discloses an adjustable tension structure comprising a spring-loaded dial. Other prior art devices utilize a retainer arm releasably held by screw tension. However, these latter devices are basically spring-loaded devices and do not provide for calibrated adjustments. See for example U.S. Pat. No. 2,730,832 and U.S. Pat. No. Re. 25,650. Still other prior art devices, such as in U.S. Pat. No. 3,269,051, disclose a sinker line release mechanism utilizing two plate-like structures connected by an adjustable nut and bolt assembly, each of the plate-like structures possessing a notch-like indentation, adapted, by their opposing tracks, to retain a sinker line. However, in these latter devices, there is no disclosure of utilizing a fishing line retainer arm between the two plate-like structures with adjustable stop members defining the tension required on the fishing line to activate the device. The present application provides yet another solution to the same problems.

SUMMARY OF THE INVENTION

In accordance with the present invention, a fishing line release device is disclosed, comprising a pair of substantially disk-shaped, axially reciprocable shell members having concave inner surfaces lying in juxtaposition to each other and defining a hollow body, and a pair of axially aligned cylindrical hub portions centrally juxtaposed in fixed position upon respective inner surfaces, each of the hub portions having a centrally located bore, one of the bores being screw-threaded.

A fishing line retainer comprising a circular base ring is adapted for rotatable, seated, annular engagement with at least one of the hub portions, and has an arm integral at one end with the base ring and radially extending therefrom, the arm defining at the free end thereof a hook-shaped member. At least two rod-shaped stop members are fixedly attached to the inner surfaces of the shell members to limit the rotation of the arm about the hub portions.

Also, radial recesses are provided on the shell members which permit the protrusion of the fishing line retainer to hold the line.

An adjustable locking means is provided comprising a screw-threaded shaft adapted to mate with complementary threads of the screw-threaded bore in the hub portion, a means for rotating the shaft within the bore to incrementally move the shell members axially toward each other, and an adjustable stop member which is located adjacent a fixed stop member and projects from the opposing shell member. When the fishing line retainer is disposed between the adjustable stop member and the adjacent fixed stop member, the hook-shaped member of the retainer and the outer periphery of the shell members define an eye for retaining a fishing line. By rotating the screw-threaded shaft to place tension on the shell members, the space between the adjustable stop member and the fixed stop member is reduced, thus increasing the force required to pull the retainer arm through the space to free the fishing line from the eye. When this force is overcome, the adjustable stop member deforms slightly to release the retainer arm, which in turn frees the fishing line from the eye and provides the desired slack.

Accordingly, it is a principal object of the present invention to provide a fishing line release device in which a slack is provided in the fishing line after a fish has initially attacked the bait.

It is a further object of the present invention to provide a fishing line release device as aforesaid which provides a calibrated adjustment of the responsive force required to release the fishing line.

It is a still further object of the present invention to provide a fishing line release device as aforesaid wherein a hook is provided for the retention of a fishing line which is adjustably releasable to provide slack in the fishing line.

It is a yet further object of the present invention to provide a fishing line release device which is of simple and durable construction, is inexpensive to manufacture, and is light in weight.

Further objects and advantages will become apparent to those skilled in the art from the ensuing description which proceeds with reference to the accompanying figures.

DETAILED DESCRIPTION OF THE INVENTION

Figure 1:
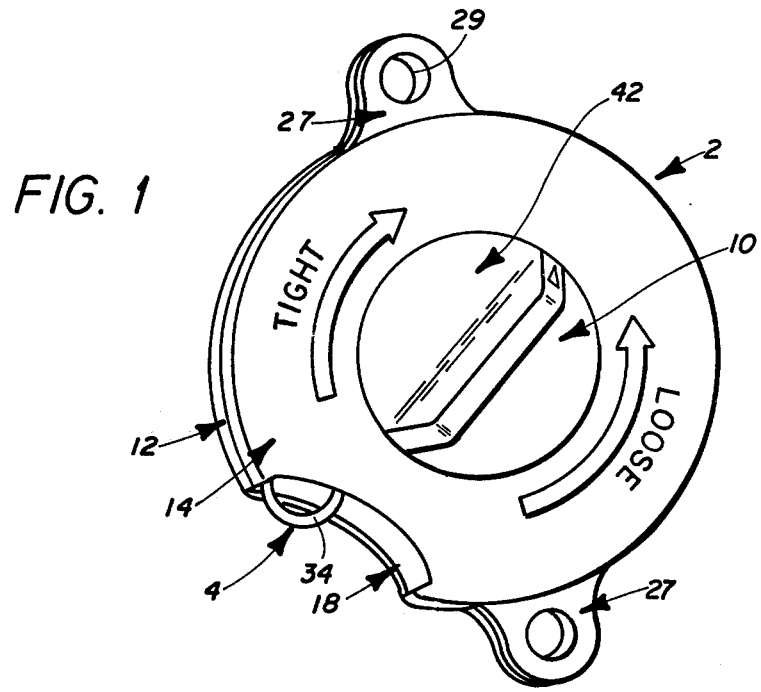
FIG. 1 is a perspective view of one embodiment of the fishing line release device of the present invention.
Figure 2:
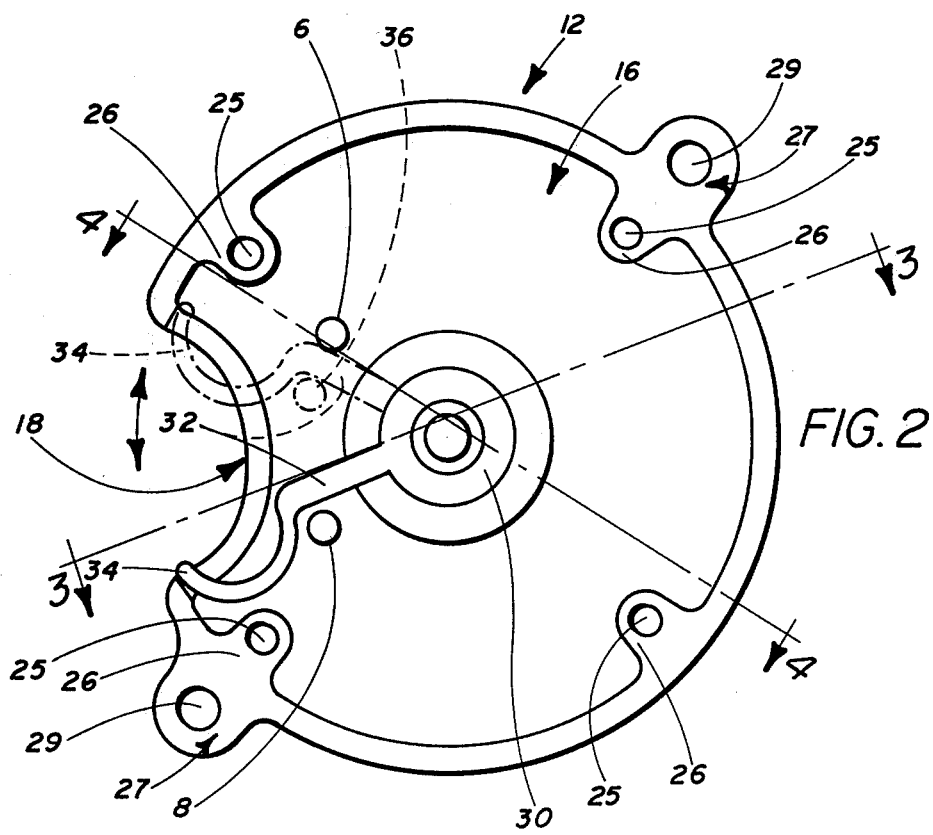
FIG. 2 is a top plan view partly in phantom of one of the shell members of the fishing line release device of FIG. 1 showing the retainer in the line retaining and open positions.

Referring to the drawings wherein like numerals designate like parts, and particularly to FIGS. 1 and 2, the fishing line release device comprises a line release housing 2, a fishing line retainer 4, two fixed stop members 6 and 8, and an adjustable locking means 10.

Line release housing 2 comprises a pair of substantially disk-shaped shell members comprising lower shell member 12 and upper shell member 14. The shell members possess respective concave inner surfaces 16 and 16' shown in FIGS. 3 and 4 lying in juxtaposition to each other, which define a hollow body therebetween. Shell members 12 and 14 are adapted for axial reciprocation in connection with locking means 10 to secure the position of retainer 4 to hold the fishing line. Each shell member has a corresponding radially inwardly directed recess 18 which, as shown in FIGS. 1 and 2, defines a concavely arcuate configuration along a minor portion of the circumference of shell members 12 and 14. Recess 18 provides an area of protrusion for the fishing line retainer 4, as discussed in detail, below.

Figure 3:
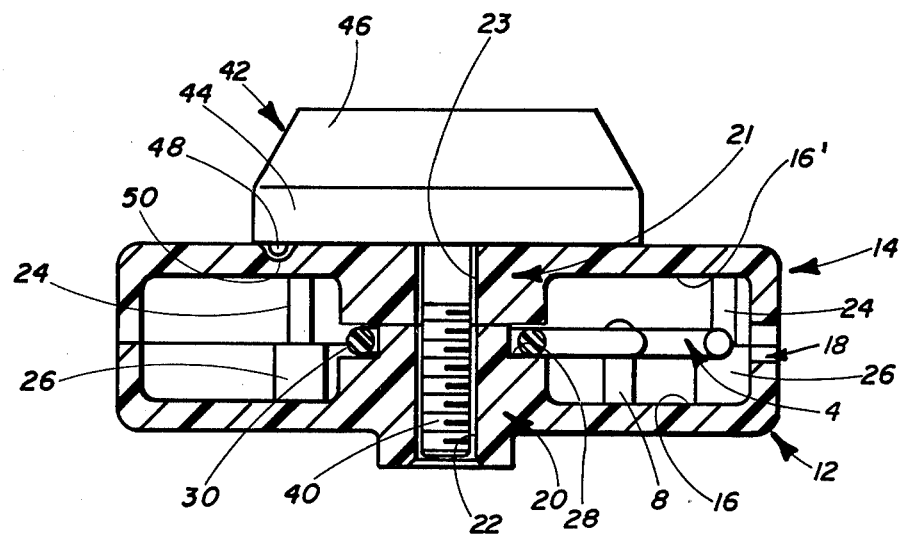
FIG. 3 is a side cross-sectional view of the fishing line release device taken along line 3—3 of FIG. 2 in the maximum tension position with the fishing line retainer in the release position.
Figure 4:
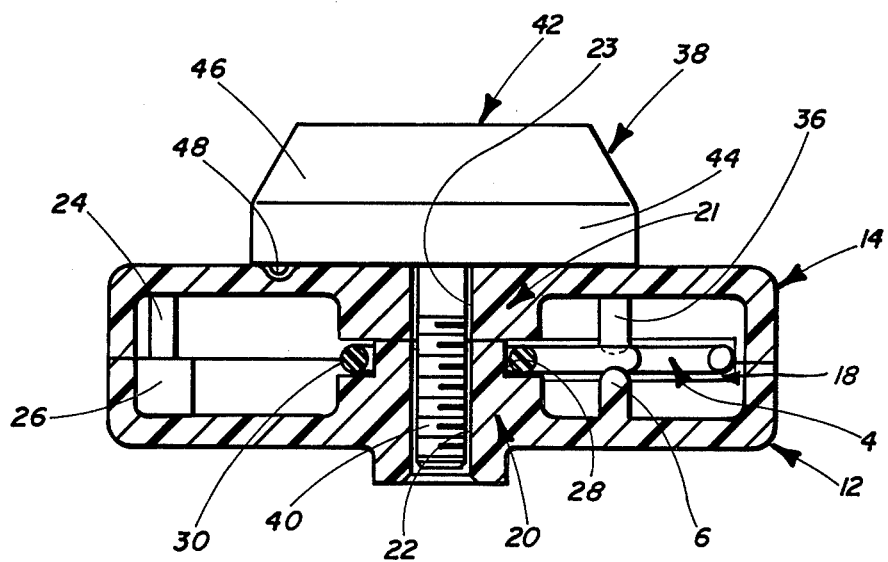
FIG. 4 is a side cross-sectional view of the fishing line release device in the maximum tension, line retaining position taken along line 4—4 of FIG. 2.

The line release device of the present invention is illustrated in FIGS. 3 and 4 in cross-section, wherein shell members 12 and 14 are seen to reside in axial alignment to comprise housing 2. Shell members 12 and 14 define, respectively, cylindrical hub portions 20 and 21 which are centrally disposed in fixed position within respective inner surfaces 16 and 16', and are in corresponding axial alignment with each other. Each of the hub portions defines a centrally located bore, the bore 22 of hub portion 20 being screw-threaded and the bore 23 of hub portion 21 being of slightly larger diameter than that of bore 22 to permit shell member 14 to reciprocate along screw threaded shaft 40. Additionally, hub portion 20 is necked down at the end thereof closest to abutment with hub portion 21 to define a seat area 28 for the location of line retainer 4.

Referring to FIGS. 2, 3 and 4, shell members 12 and 14 are held in non-rotational juxtaposition by the engagement paired pegs 24 and slots 25 located, respectively, in regular fashion along the inner periphery of the circumference of shell members 14 and 12. Slots 25 are located within enlarged peripheral housings 26 and, as shown in FIG. 2, are located in regularly spaced position along the inner periphery of shell member 12. As the pegs 24 and slots 25 do not fixedly engage, they provide an effective positioning means enabling the respective shell members to stay in rotational alignment during the operation of the line release device of the present invention which, as will be seen hereinafter, involves the capability of slight axial reciprocation of the shell members with respect to each other.

Line release housing 2 also includes at least one ear member 27 located exteriorly along the circumference thereof, which defines an aperture 29 therein for supporting housing 2 by a separate line. In the instance where the device of the present invention is to be suspended in outrigger fashion between two sections of a line, two ears 27 are provided in the manner illustrated in FIGS. 1, 2 and 5. Correspondingly, when the device to be suspended from a single line in "flat line" fashion, a single ear 27' is provided in the manner illustrated in FIG. 6.

Referring further to FIGS. 2–4, the fishing line retainer 4 of the present invention comprises a circular base ring 30 adapted for rotatable, annular positioning within seat 28 of hub portion 20 so as to be disposed between hub portions 20 and 22. Line retainer 4 also includes an arm 32 integral at the proximal end thereof with base ring 30, which extends radially to define at its distal end thereof a hook-shaped member 34. Hook member 34 can be seen, in FIGS. 1, 2, 5 and 6 to provide in the closed position the necessary containment for a fishing line prior to release.

In addition to fishing line retainer 4, the line release mechanism of the present invention comprises two rod-shaped stop members 6 and 8 which are fixedly attached to the inner surface of shell member 12 for controlling the arc of rotation of arm 32 about hub portion 20. Referring to FIGS. 3 and 4, stop members 6 and 8 are seen to comprise elongated posts of a longitudinal dimension sufficient to obstruct the rotation of line retainer 4. Accordingly, referring to FIG. 2, arm 32 is illustrated in phantom as having a restricted angular rotation extending between stop members 6 and 8, with the open position comprising the situation of arm 32 adjacent stop member 8, while the closed position comprises residence adjacent stop member 6.

Adjustable locking means generally designated 10 in the Figures is provided to secure line retainer 4 in the locking position as illustrated in FIGS. 1, 2 and 4–6. Locking means 10 comprises a rod-like adjustable stop member 36 which is integral with inner surface 16' and projects therefrom into circumferentially displaced promixity with stop member 6 in a manner illustrated in phantom in FIG. 2 and FIG. 4. Adjustable stop member 36 thus coacts with stop member 6 in the manner illustrated in phantom in FIG. 2, as well as in section in FIG. 4, to secure line retainer 4, and specifically arm 32 in fixed position. Stop member 36 is thus adjusted into frictional abutment on one side of arm 32 to prevent its movement out of the locked position as shown in FIG. 1, by the urging of shell member 14 toward shell member 12.

Referring further to FIGS. 2 and 4, stop member 36 and stop member 6 straddle arm 32 from opposite directions to maintain retainer 4 in the locked position. As can be seen in FIG. 4, ring 30 of retainer 4 is of lesser diameter than the width dimension comprising the clearance provided by hubs 21 and 20. Ring 30 and the rest of arm 4 are afforded some lateral oscillation. Stop 36 in its fullest extension, shown in phantom in FIG. 4, makes tangential contact with arm 32. Escape of arm 32 and release of retainer 4 can thus occur by a combination of slight downward oscillation and flexure of arm 32 in combination with slight flexure of stop member 36. Flexure of the respective components outlined above, is possible, as the device of the present invention is preferably constructed from an organic resinous material, as illustrated in FIGS. 3 and 4 and thus possesses some resilience. The extent to which the release of retainer 4 occurs readily is a function of the axial compressive force exerted by screw-type adjustment 38. The means for adjusting the distance between the respective shell members and, correspondingly, the tension placed upon retainer 4 comprises a screw-type adjustment 38 which comprises a screw-threaded shaft 40 adapted to mate with the complementary threads provided within bore 22. Shaft 40 passes freely through bore 23 of shell member 14 and is attached at the unthreaded end thereof to dial 42 which includes a circular base plate 44 and a handle 46 extending the diameter of plate 44 in a plane perpendicular thereto.

Figure 5:
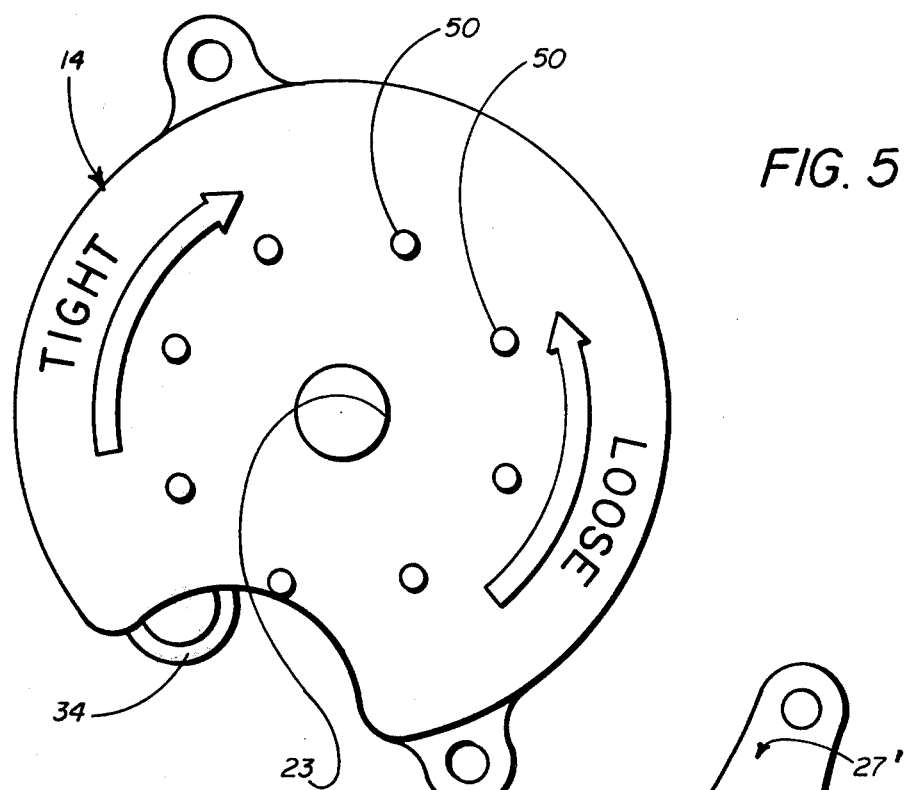
FIG. 5 is a top plan view of the device of FIG. 1 with the line tension adjustment dial removed.
Figure 6:
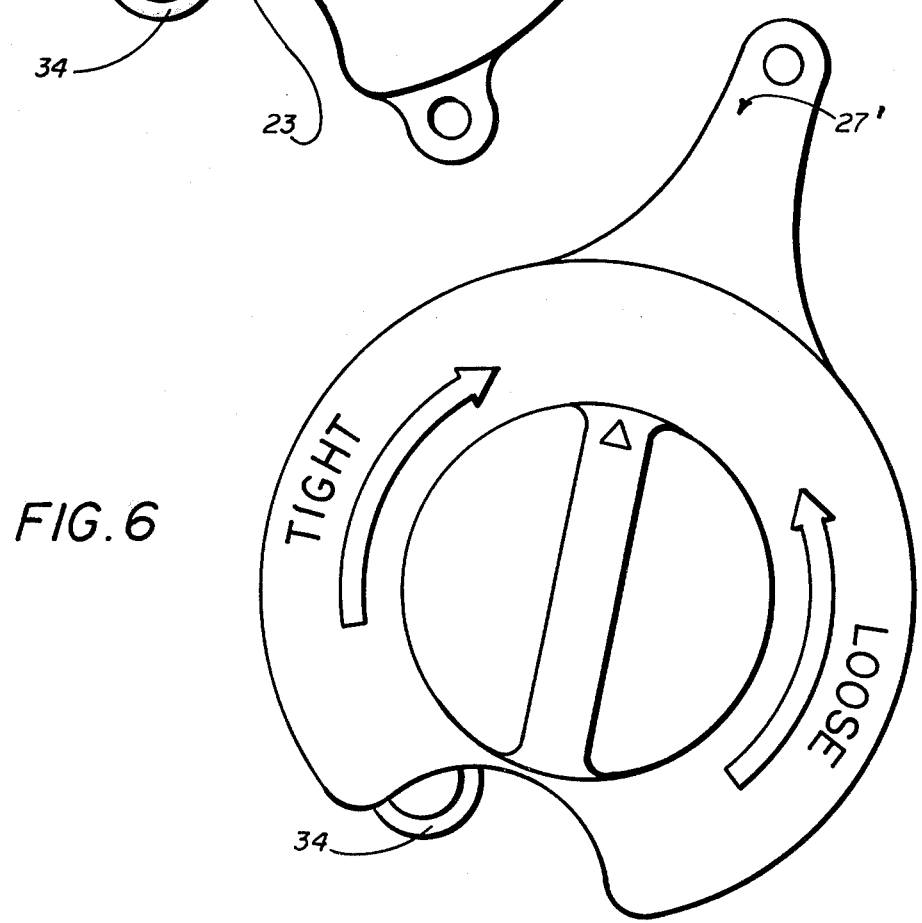
FIG. 6 is a perspective view of an alternate embodiment of the present invention.

Rotation of dial 42 in the "TIGHT" direction as shown in FIGS. 1, 5 and 6, causes shaft 40 to travel further toward and within hub 20, which, in turn, urges shell member 12 toward dial 42. Referring to FIGS. 3 and 4, base plate 44 urges against the outer surface of shell member 14 to cause shell member 14 to travel toward shell member 12. Correspondingly, stop members 6 and 36 move toward each other, and in the illustration of FIG. 4 and the phantom depiction of FIG. 2, cooperate to straddle and restrain arm 32. Though shell members 12 and 14 are illustrated in FIGS. 3 and 4 in abutment in the maximum tension position, it is to be understood that the shell members will be able to move apart to allow the escape of arm 32 from stop members 6 and 36 under the application of lesser tension.

Referring again to FIGS. 3 and 4, the rotational action of shaft 40 determines the proximity of stop members 6 and 36, and the restraining tension they impose upon are 32. Dial 42 enables the user to adjust the tension restraining arm 32, and consequently the tension required to overcome the stop members to move the arm and release the fishing line.

Referring now to FIGS. 3-5, plate 44 is capable of incremental positioning against the outer surface of shell member 14. Regularly spaced detents 50 are provided on shell member 14 in a circular patern as illustrated in FIG. 5, and are adapted to releasably receive a projection 48 provided on the surface of plate 44 adjacent the outer surface of shell member 14, as illustrated in FIGS. 3 and 4. Thus, the movement of dial 42 is capable of regulated, incremental interruption to provide an effective calibration for variation in the tension applied against retainer 4 by the relative proximity of stop members 6 and 36. The resistance to movement engendered by the above adjustment may be varied as shown to account for differences in the nature of the fishing done, and, therefore, the present invention is adaptable to a great number of such situations.

In operation, the fishing line release device of the present invention is initially supported by a separate line attached to its ear members 27. In the case of the employment of the embodiment of FIG. 1. In the instance where the embodiment of FIG. 5 is employed, the singular line is attached to ear member 27' for support of the device. After mounting, the device is then set in locking position by the loosening of the tension between shell members 12 and 14 achieved by the rotation of dial 42 in the direction indicated in FIG. 1 by the arrow as "loose". After this rotation, hook-shaped member 34 is then brought into position adjacent stop members 6, whereupon dial 42 is then rotated in a direction indicated by the arrow in FIG. 1 and is "tight". Tightening of dial 42 may be continued until a fair amount of tension is required to move hook-shaped member 34. The user can experiment with the device to determine the appropriate adjustment for the achievement of the particular line tension and resistance required by certain types of fish.

Upon completion of the above described adjustment of hook-shaped member 34, the fishing line to be retained may be threaded through the eyelet defined by member 34 and the fishing may commence. When a fish strikes at the bait, the force on the fishing line will cause the arm 32 and hook-shaped member 34 to pass through the space defined by adjustable stop member 36 and fixed stop member 6, whereby hook-shaped member 34 will open and the fishing line will be released therefrom. In this manner, a slack will be provided in the fishing line which will cause the bait to become motionless in the water. This fish, thinking its prey to be stunned, will move in for the kill whereupon it will be caught.

While there have been herein shown and described the perferred embodiments of the present invention, it will be understood that the invention may be embodied otherwise than as herein specifically illustrated or described and that within said embodiment certain changes in the detail and construction, and the form or arrangement of the parts may be made without departing from the underlying idea or principles of this invention within the scope of the appended claims.

What is claimed is:
1. A fishing line release device comprising:
   a line release housing comprising a pair of substantially disk-shaped shell members, said shell members possessing convex outer surfaces and concave inner surfaces lying in juxtaposition to each other, said shell members defining a hollow body therebetween, recessed sections on said shell members, and a pair of axially aligned cylindrical hub portions adjacent and centrally disposed in fixed position within respective shell members, each of said hub portions having a bore located centrally therein, one of said bores comprising a screw-threaded bore;
   a fishing line retainer comprising a circular base ring adapted for rotatable, seated, annular engagement with at least one of said hub portions, and an arm integral at one end with said base ring and radially extending therefrom, said arm defining at the free end thereof a hook-shaped member;
   at least two rod-shaped, fixed stop members integral with said inner surfaces of said shell members for controlling the rotation of said arm about said hub portions; and
   an adjustable locking means comprising a screw-threaded shaft adapted to mate with complementary threads provided within said screw-threaded bore, means for rotating said shaft within said bore for axially reciprocating said shell members with respect to each other, and a linearly aligned adjustable stop member on the inner surface of one of said shell members, said adjustable stop member serving to retain said arm within an adjustable space defined by said adjustable stop member and one of said fixed stop members.

2. The device of claim 1 wherein said housing includes at least one ear member, each ear member having an aperture therein for supporting said housing by a separate line.

3. The device of claim 1 wherein said means for rotating said screw-threaded shaft includes a circular plate centrally attached to said screw-threaded shaft, and a handle means attached to said circular plate for rotating said circular plate and said screw-threaded shaft.

4. A fishing line release device comprising:
   a line release housing comprising a pair of substantially disk-shaped shell members, said shell members possessing extended peripheral surfaces, convex outer surfaces and concave inner surfaces lying in juxtaposition to each other defining a hollow body therebetween, corresponding recessed sections on said shell members, a pair of axially aligned cylindrical hub portions adjacent and centrally disposed in fixed position within respective shell members, each of said hub portions having a centrally located bore, one of said bores being screw-threaded, and at least one ear member having an aperture therefor for supporting said housing by a separate line;
   a fishing line retainer comprising a circular base ring adapted for rotatable, seated, annular engagement with at least one of said hub portions, and an arm integral at one end with said base ring and radially extending therefrom, said arm defining at the free end thereof a hook-shaped member;

at least two fixed stop members attached to the inner surface of one of said shell members for controlling the rotation of said arm about said hub portions; and an adjustable locking means comprising a screw-threaded shaft adapted to mate with complementary threads provided within said screw-threaded bore, means for rotating said shaft within said bore for axially reciprocating said shell members with respect to each other comprising a circular plate centrally attached to said screw-threaded shaft, and a handle means attached to said circular plate for rotating said circular plate and said screw-threaded shaft, and a linearly aligned adjustable stop member on the inner surface of the shell member facing said fixed stop members, said adjustable stop member disposed circumferentially adjacent one of said fixed stop members defining an adjustable space therebetween to releasably straddle and engage said arm, wherein said hook-shaped member and the recessed sections on said shell members of said housing define an eye for retaining a fishing line when said retainer is disposed between said adjustable stop member and the fixed stop member circumferentially adjacent thereto, and wherein the axial reciprocation of said shell members changes the force required to release said hook member to release said fishing line from said eye to provide a slack in said fishing line.

5. The device of either of claims 3 or 4 wherein said adjustable locking means further comprises an incremental positioning means comprising a projection defined on said circular plate and a plurality of circumferentially disposed, regularly spaced detents provided on the outer surface of said shell member adjacent said circular plate, said projection adapted to rotatably index into sequential engagement with said detents to permit the incremental rotation of said screw-threaded shaft.

* * * * *